(12) United States Patent
Sherkin et al.

(10) Patent No.: US 8,522,035 B2
(45) Date of Patent: Aug. 27, 2013

(54) ASSISTED CERTIFICATE ENROLLMENT

(75) Inventors: Alexander Sherkin, Woodbridge (CA);
Michael Carrara, Ottawa (CA);
Alexander Truskovsky, Waterloo (CA)

(73) Assignee: BlackBerry Limited, Waterloo (CA)

( * ) Notice: Subject to any disclaimer, the term of this patent is extended or adjusted under 35 U.S.C. 154(b) by 20 days.

(21) Appl. No.: 13/369,487

(22) Filed: Feb. 9, 2012

(65) Prior Publication Data

US 2013/0073856 A1    Mar. 21, 2013

Related U.S. Application Data

(60) Provisional application No. 61/536,785, filed on Sep. 20, 2011.

(51) Int. Cl.
*H04L 9/32*    (2006.01)
(52) U.S. Cl.
USPC .............. 713/176; 713/156; 713/168; 726/10
(58) Field of Classification Search
None
See application file for complete search history.

(56) References Cited

U.S. PATENT DOCUMENTS

| | | | |
|---|---|---|---|
| 5,943,423 A | 8/1999 | Muftic | |
| 6,978,364 B1 | 12/2005 | Balaz | |
| 7,069,441 B2 | 6/2006 | Balaz | |
| 7,349,912 B2 | 3/2008 | Delany et al. | |
| 7,380,008 B2 | 5/2008 | Teng | |
| 7,386,721 B1 | 6/2008 | Vilhuber | |
| 7,415,607 B2 | 8/2008 | Sinn | |
| 7,444,508 B2 | 10/2008 | Karjala | |
| 7,500,269 B2 | 3/2009 | Huotari | |
| 7,506,158 B2 | 3/2009 | Fox et al. | |
| 7,748,035 B2 | 6/2010 | Nedeltchev | |
| 7,761,910 B2 | 7/2010 | Ransom | |
| 8,255,685 B2* | 8/2012 | Truskovsky et al. | 713/156 |
| 8,341,715 B2* | 12/2012 | Sherkin et al. | 726/10 |
| 2002/0174238 A1 | 11/2002 | Sinn et al. | |
| 2003/0131063 A1* | 7/2003 | Breck | 709/206 |
| 2004/0005876 A1 | 1/2004 | Tuoriniemi | |
| 2004/0223156 A1* | 11/2004 | McGrew et al. | 356/364 |
| 2005/0081039 A1* | 4/2005 | Lee et al. | 713/176 |
| 2005/0154889 A1* | 7/2005 | Ashley et al. | 713/171 |
| 2006/0000127 A1* | 1/2006 | Schindele | 40/124.06 |
| 2006/0253703 A1 | 11/2006 | Eronen et al. | |
| 2007/0079139 A1* | 4/2007 | Kim | 713/186 |
| 2008/0046735 A1 | 2/2008 | Nedeltchev et al. | |

(Continued)

FOREIGN PATENT DOCUMENTS

KR    1020120053929    2/2013
WO    2005006703 A2    1/2005

OTHER PUBLICATIONS

Adi et al., "Authenticated Mobile Device Proxy Service", Proceedings of World Academy of Science, Engineering and Technology, vol. 5, Apr. 2005, ISSN 1307-6884.

(Continued)

*Primary Examiner* — Haresh N Patel
(74) *Attorney, Agent, or Firm* — Ridout & Maybee LLP

(57) ABSTRACT

A certificate enrollment assistant module may be provided to inject a challenge password into a certificate signing request to be sent, to a Certificate Authority, from a computing device. The certificate enrollment assistant module, thereby, acts as a trusted proxy to assist the computing device in building a valid certificate signing request without the computing device having access to the challenge password.

14 Claims, 4 Drawing Sheets

(56) References Cited

U.S. PATENT DOCUMENTS

| | | |
|---|---|---|
| 2009/0025080 A1 | 1/2009 | Lund et al. |
| 2009/0055722 A1* | 2/2009 | Eorgoff et al. ............... 715/211 |
| 2009/0144552 A1* | 6/2009 | Fort ............................ 713/178 |
| 2009/0222903 A1* | 9/2009 | Sherkin et al. ................ 726/10 |
| 2010/0088507 A1* | 4/2010 | Cho ............................. 713/156 |
| 2010/0306352 A1 | 12/2010 | Pritikin |
| 2011/0250412 A1* | 10/2011 | Johnson et al. ........... 428/195.1 |
| 2011/0301993 A1* | 12/2011 | Berger et al. ................ 705/7.13 |
| 2012/0114725 A1* | 5/2012 | Rosset ......................... 424/411 |
| 2012/0124375 A1* | 5/2012 | Truskovsky et al. .......... 713/168 |
| 2012/0246482 A1* | 9/2012 | Sherkin et al. ................ 713/176 |

OTHER PUBLICATIONS

Simple Certificate Enrollment Protocoi / draft-nourse-scep-23 (Pritikin et al.) Sep. 7, 2001 [http://datatracker.ietf.org/doc/draft-nourse-sceprl] *2.2. Requester authenication / 2.3. Enrollment authorization / 2.5. Certificate Enrollment / 8. Security Considerations*.

ISR for application PCT/CA2012/050486 dated Oct. 24, 2012.

\* cited by examiner

ASSISTED CERTIFICATE ENROLLMENT

CROSS-REFERENCE TO RELATED APPLICATION

This application claims the benefit of and priority to U.S. Provisional Patent Application No. 61/536,785 filed Sep. 20, 2011 under the title ASSISTED CERTIFICATE ENROLLMENT.

The content of the above patent application is hereby expressly incorporated by reference into the detailed description hereof.

FIELD

The present application relates generally to identity certificates used to authenticate public cryptographic keys and, more specifically, to assisted certificate enrollment.

BACKGROUND

User devices, including, but not restricted to, wireless mobile communication devices, personal computers, laptop or portable computers, smartphones, personal digital assistants (PDAs), and the like, may generate cryptographic keys for use in a public key infrastructure (PKI) scheme. In a PKI scheme, a device generates a public key and a corresponding private key. However, such keys are of little use unless the public key is reliably associated with the identity of the user device, or of the user of the user device.

A public key certificate (or identity certificate) is an electronic document, issued by a trusted party. The public key certificate incorporates a digital signature to bind together a public key with an identity—information such as the name of a person or an organization, an associated address and so forth. The certificate can be used to verify that a public key belongs to a device or an individual.

An identity certificate typically contains: a public key; an owner's name; an expiration date of the public key; an identity of the Certificate Authority that issued the digital certificate; a serial number for the digital certificate; and a digital signature of the issuer.

BRIEF DESCRIPTION OF THE DRAWINGS

Reference will now be made, by way of example, to the accompanying drawings, which show example implementations; and in which.

DETAILED DESCRIPTION

Figure 1:
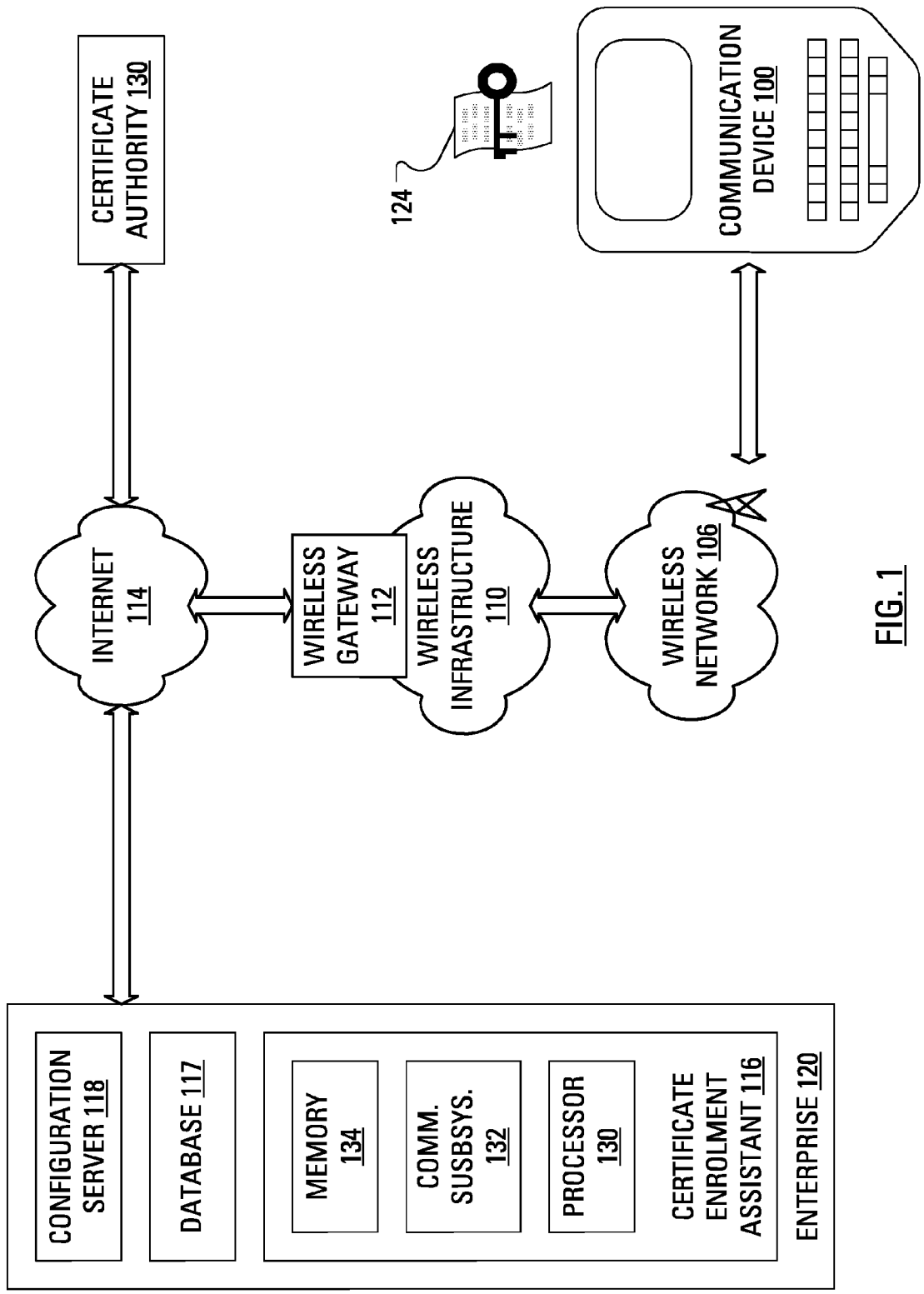
FIG. 1 illustrates an example system, including a mobile communication device, a certification authority and a certificate enrollment assistant module, in which aspects of the present application find use.

In public key infrastructure systems, a certificate signing request (also "CSR" or certification request) is a message sent from an applicant to a Certificate Authority (CA) to apply for an identity certificate for a public key that has been previously generated, with associated private key. The certificate signing request contains information identifying the applicant and the public key chosen by the applicant. The corresponding private key is not included in the certificate signing request, but is used to digitally sign the entire certificate signing request.

If the certificate signing request is successful, the CA will transmit, back to the applicant, a client certificate that has been digitally signed with the private key of the CA, for example, as an attachment to an e-mail message.

The known Simple Certificate Enrollment Protocol (SCEP) allows a computing device to obtain a client certificate from a certificate authority (CA). The obtained client certificate may be further used for device authentication. However, to obtain a client certificate from a CA, a device needs to authenticate itself to the CA. the SCEP specification (which is available as "draft-nourse-scep-22" from tools.ietf.org) supports different authentication mechanisms. One mechanism, the so-called "challenge password" mechanism, is supported by a wide range of PKI infrastructure vendors. The challenge password mechanism requires a device to supply a password to the CA. Moreover, some vendors support only the so-called "global challenge password" mechanism, in which the same password is used by all devices.

It may be recognized as problematic that the global challenge password does not authenticate individual devices and can be used to obtain a certificate for any identity. Accordingly, it may be prudent to avoid exposing the global challenge password directly to devices.

It is proposed herein to have a computing device collaborate with a certificate enrollment assistant module to formulate a properly formatted SCEP certificate signing request. Conveniently, the certificate enrollment assistant module maintains the global challenge password and, during the collaboration, there is no requirement to reveal the challenge password to the computing device. The certificate enrollment assistant module would normally be deployed within a corporate communication infrastructure so that the certificate enrollment assistant module can be trusted with the global challenge password. Notably, within the corporate communication infrastructure, the certificate enrollment assistant module may be implemented at a messaging server. Alternatively, outside of a corporate communication infrastructure, the certificate enrollment assistant module may be implemented at a trusted server in what is colloquially referred to as "the cloud".

According to an aspect of the present disclosure, there is provided a method of obtaining a certificate. The method includes transmitting a certificate signing request to a certificate enrollment assistant module, receiving, from the certificate enrollment assistant module, a hash of an altered version of the certificate signing request, the altered version of the certificate signing request including a challenge password, signing the hash to produce a signature for the altered version of the certificate signing request and transmitting the signature to the certificate enrollment assistant module. The method further includes receiving an enveloped version of the altered version of the certificate signing request, determining a signature for the enveloped version of the altered version of the certificate signing request, transmitting the enveloped version of the altered version of the certificate signing request and the signature for the enveloped version of the certificate signing request to a certificate authority. In other aspects of the present application, a computing device is provided for carrying out this method and a computer readable medium is provided for adapting a processor in a computing device to carry out this method.

According to another aspect of the present disclosure, there is provided a method of assisting a computing device to request a certificate. The method includes receiving, from a computing device, a certificate signing request, amending the certificate signing request to include a challenge password to produce a password-carrying certificate signing request, determining a hash of the password-carrying certificate signing request and transmitting the hash to the computing device. The method further includes receiving, from the computing device, the certificate signing request and a signature, amending the certificate signing request to include a challenge password to produce a signed, password-carrying certificate signing request, encrypting the signed, password-carrying certificate signing request to produce an encrypted signed, password-carrying certificate signing request and transmitting, to the computing device, the encrypted, signed, password-carrying certificate signing request. In other aspects of the present application, a certificate enrollment assistant module is provided for carrying out this method and a computer readable medium is provided for adapting a processor implementing a certificate enrollment assistant module to carry out this method.

Referring to FIG. 1, an overview of an example system for use with the embodiments described below is shown. One skilled in the art will appreciate that there may be many different topologies, but the system shown in FIG. 1 helps demonstrate the operation of the systems and methods described in the present application. For example, there may be many user devices connected to the system that are not shown in the overview of FIG. 1.

FIG. 1 shows a computing device in the form of a generic communication device 100. It will be appreciated by those skilled in the art that the communication device 100 may comprise any computing or communication device that is capable of connecting to a network by wireless means, including, but not limited, to personal computers (including tablet and laptop computers), personal digital assistants, smart phones, and the like. It will further be appreciated by those skilled in the art that these devices may be referred to herein as computing devices or communication devices, and may have principal functions directed to data or voice communication over a network, data storage or data processing, or the operation of personal or productivity applications; those skilled in the art will appreciate that terminology such as "mobile device", "communication device", "computing device", or "user device" may be used interchangeably.

The communication device 100 may, for example, be connected to an Internet Service Provider on which a user of the system of FIG. 1, likely the user associated with the communication device 100 illustrated in FIG. 1, has an account.

The communication device 100 may be capable of sending and receiving messages and other data via wireless transmission and reception, as is typically done using electromagnetic waves in the radio frequency (RF) spectrum. The exchange of messages and other data may occur, for instance, between the communication device 100 and a base station in a wireless network 106. The communication device 100 may receive data by other means, for example through a direct connection to a port provided on the communication device 100. An example of such a direct connection is a Universal Serial Bus (USB) link.

As illustrated in FIG. 1, the wireless network 106 connects to a wide area network 114, represented as the Internet, via a wireless infrastructure 110. The wireless infrastructure 110 incorporates a wireless gateway 112 for connecting to the Internet 114.

A connection between the communication device 100 and the Internet 114 allows the communication device 100 to access a certificate enrollment assistant 116 that is connected to the Internet 114. Also connected to the Internet 114 may be a configuration server 118. The certificate enrollment assistant 116 and the configuration server 118 may be grouped together in an enterprise 120 and share access to a database 117. Also connected to the Internet 114 may be a certificate authority 130. The communication device 100 may store a key pair 124 that includes a private cryptographic key and a corresponding public cryptographic key.

Figure 2:
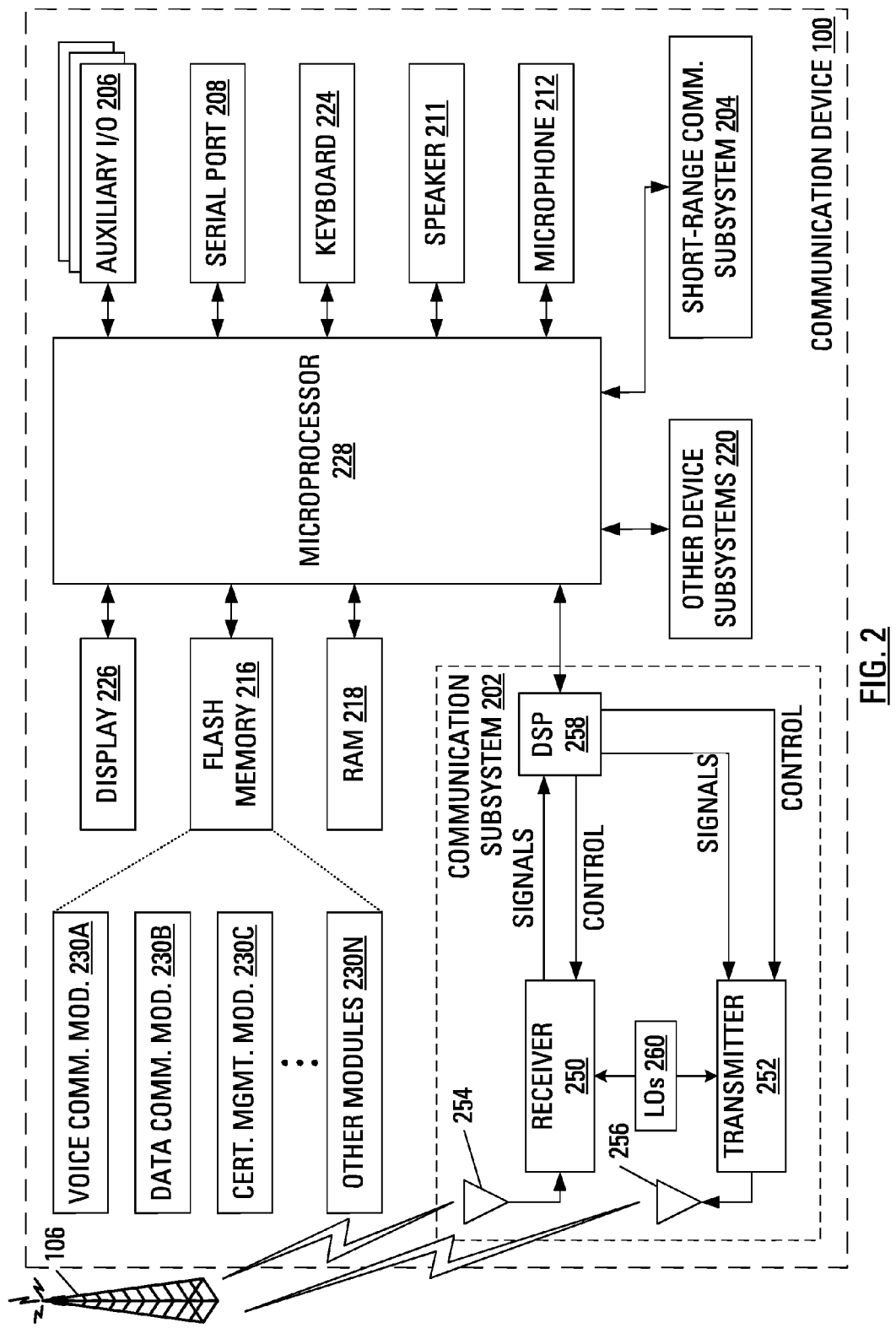
FIG. 2 illustrates a block diagram of the user device of FIG. 1 according to an embodiment.

FIG. 2 illustrates the communication device 100 as a mobile communication device 100. The mobile communication device 100 includes a housing, an input device (e.g., a keyboard 224 having a plurality of keys) and an output device (e.g., a display 226), which may be a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile communication device 100, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the mobile communication device 100 are shown schematically in FIG. 2. These may include a communications subsystem 202, a short-range communications subsystem 204, the keyboard 224 and the display 226. The mobile communication device 100 may further include other input/output devices, such as a set of auxiliary I/O devices 206, a serial port 208, a speaker 211 and a microphone 212. The mobile communication device 100 may further include memory devices including a flash memory 216 and a Random Access Memory (RAM) 218 and various other device subsystems 220. The mobile communication device 100 may comprise a two-way radio frequency (RF) communication device having voice and data communication capabilities. In addition, the mobile communication device 100 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile communication device 100. A predetermined set of software applications that control basic device operations, such as a voice communications module 230A and a data communications module 230B, may be installed on the mobile communication device 100 during manufacture. A certificate management module 230C may also be installed on the mobile communication device 100 during manufacture, to implement aspects of the present disclosure. As well, additional software modules, illustrated as an other software module 230N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile communication device 100 is intended to operate. For example, the communication subsystem 202 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE) etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In networks such as GPRS, UMTS, and LTE however, network access is associated with a subscriber or user of a device. A GPRS, UMTS or LTE device therefore uses a subscriber identity module, commonly referred to as a Subscriber Identity Module (SIM) card, or a Universal Subscriber Identity Module (USIM). Other networks and other SIM equivalents are within the scope of the present disclosure. The USIM comprises applications contained or stored in a Universal Integrated Circuit Card (UICC) or an embedded Universal Integrated Circuit Card (eUICC). These applications contain the various parameters that enable a device to operate on a GPRS, UMTS or LTE network. Mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, a trackball, a touchscreen, or some other type of input device. The composed data items may then be transmitted over the wireless carrier network 270 via the communication subsystem 202.

In a voice communication mode, overall operation of the device is substantially similar to the data communication mode, except that received signals are output to the speaker 211, and signals for transmission are generated by a microphone 212. Alternative voice or audio I/O subsystems, such as a voice message recording subsystem, may also be implemented on the mobile communication device 100. In addition, the display 226 may also be utilized in voice communication mode, for example, to display the identity of a calling party, the duration of a voice call, or other voice call related information.

The short-range communications subsystem 204 enables communication between the mobile communication device 100 and other proximate systems or devices, which need not necessarily be similar devices. For example, the short-range communications subsystem may include an infrared device and associated circuits and components, a Bluetooth™ communication module, a Radio-Frequency Identification (RFID) module, or a near field communication (NFC) module that includes an NFC controller, etc., to provide for communication with similarly-enabled systems and devices.

The certificate enrollment assistant 116 may include may components analogous to the components of the mobile communication device 100, such as a processor 130, a communication subsystem 132 and a memory 134.

In overview, a mechanism is proposed herein that provides authentication, at the CA 130, of a certificate signing request from the mobile communication device 100, while not revealing the global challenge password to the mobile communication device 100.

In operation, the certificate enrollment assistant 116 may be provided to inject a global challenge password into a certificate signing request to be sent from the mobile communication device 100. Injecting the global challenge password into the certificate signing request may involve amending the certificate signing request to include the global challenge password. The certificate enrollment assistant 116 already has a trusted relationship with the communication device 100. It is, therefore, permissible for the certificate enrollment assistant 116 to act as a trusted proxy to assist the mobile communication device 100 in building a valid certificate signing request without the mobile communication device 100 having access to the global password. Because the certificate enrollment assistant 116 will modify a signed certificate signing request, re-signing of the certificate signing request, by the mobile communication device 100, is also provided.

In a PKI configuration step, a global challenge password is provided to the certificate enrollment assistant 116. Since the certificate enrollment assistant 116 is a trusted component, providing the global password to the certificate enrollment assistant 116 may, generally, not be recognized as a new security threat.

To prepare the user device 100 for certificate management, the configuration server 118 transmits a configuration profile to the user device 100. In part, the configuration profile includes a CA profile. The CA profile includes a description of a set of information needed by the user device 100 to generate the key pair 124 and compile the information necessary to formulate a certificate signing request for the CA 130. Examples of such information include key lengths, algorithm information, necessary distinguished name information, etc.

An example CA profile has the following structure:
Certificate Authority Profile Name: Test Profile
Certificate Authority Type: MS-Enterprise
Certificate Authority Host: ca.test.domain
Certificate Port: 12345
Key Algorithm: RSA
Key Length: 2048

Figure 3:
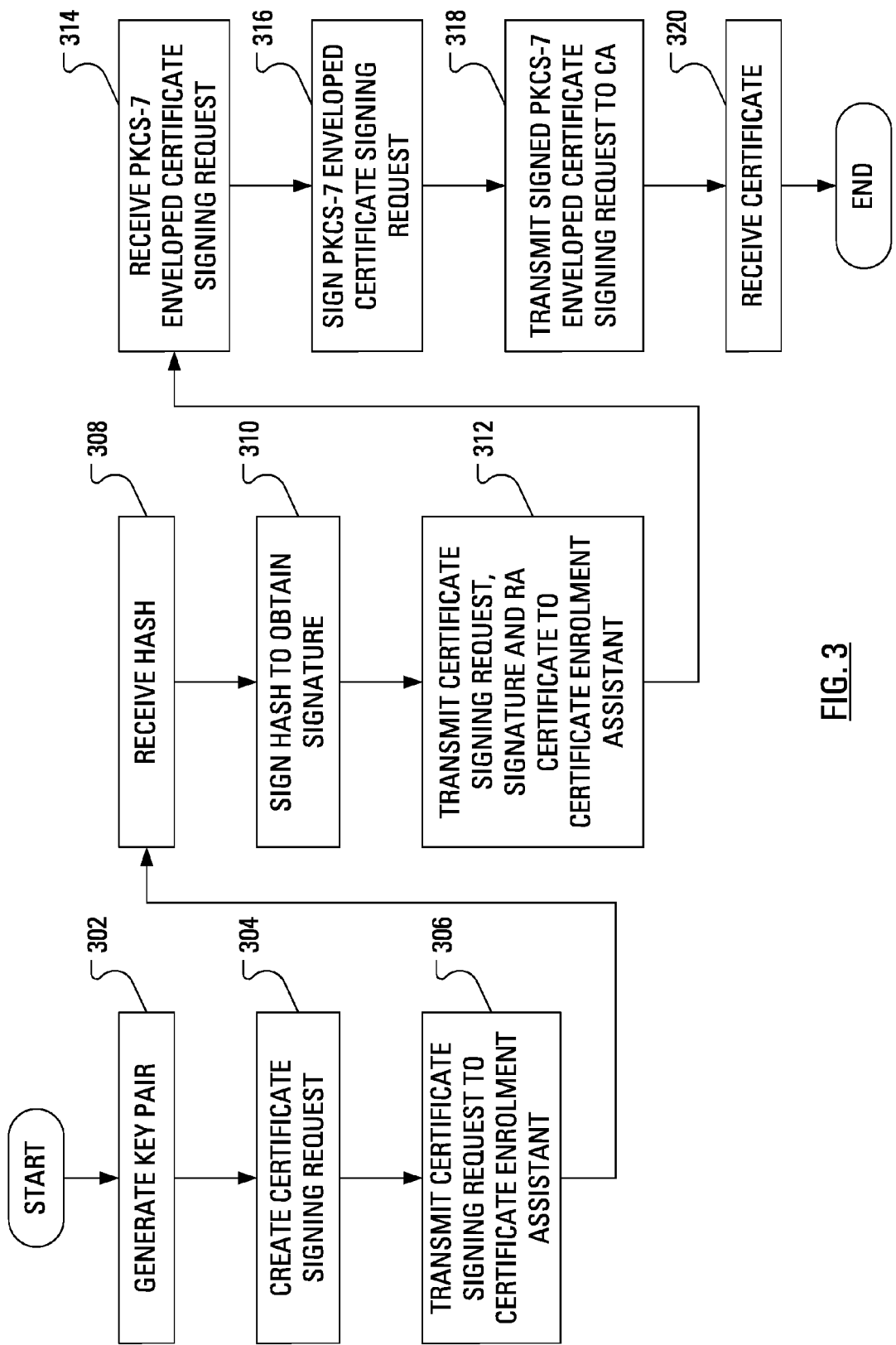
FIG. 3 illustrates example steps of a method of obtaining a certificate, for carrying out at the mobile communication device of FIG. 2, in accordance with an embodiment of the present disclosure.

In operation and in view of FIG. 3, the microprocessor 228 of the mobile communication device 100 under control, say, of the certificate management module 230C, generates (step 302) the public-private key pair 124 and may collect information that, according to the CA profile, may be sent as attributes of the certificate signing request. The mobile communication device 100 then creates (step 304) the certificate signing request.

The certificate signing request may be, for example, a PKCS-10 certificate signing request. "PKCS" refers to a group of Public Key Cryptography Standards devised and published by RSA Security. PKCS-10, in particular, is a Certification Request Standard that defines a format for messages sent to a certification authority to request certification of a public key. The PKCS-10 standard is specified in Request For Comments (RFC) 2986 published by the Internet Engineering Task Force (IETF) at www.ietf.org.

After creating (step 304) the certificate signing request, the microprocessor 228 transmits (step 306) the certificate signing request to the certificate enrollment assistant 116.

Figure 4:
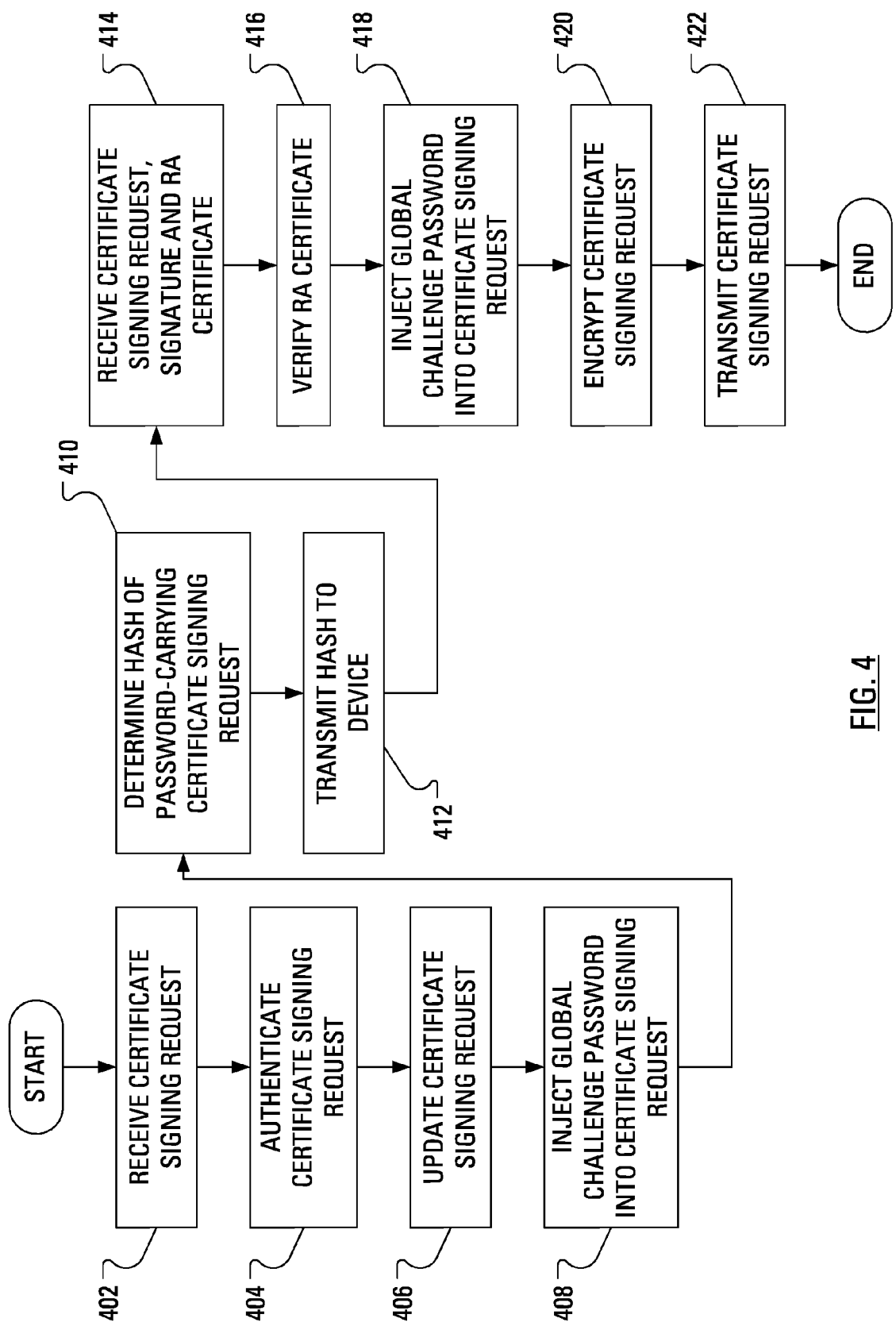
FIG. 4 illustrates example steps of a method of method of assisting a mobile communication device to obtain a certificate, for carrying out at the certificate enrollment assistant module of FIG. 2, in accordance with an embodiment of the present disclosure.

Example steps in a method of handling, at the certificate enrollment assistant 116, the certificate signing request from the mobile communication device 100 are illustrated in FIG. 4. Initially, the certificate enrollment assistant 116 may receive (step 402) the certificate signing request from the mobile communication device 100. Responsively, the certificate enrollment assistant 116 may authenticate (step 404) the certificate signing request. It may be, for example, that an authenticated channel has been previously established between the certificate enrollment assistant 116 and the mobile communication device 100. Such a previously established channel may employ encryption. Accordingly, the certificate signing request may be considered, by the certificate enrollment assistant 116, to have been authenticated (step 404) simply by virtue of having been received over the previously established authenticated channel.

As defined by the PKCS-10 standard, a certificate signing request may have many "attributes". Such attributes of a certificate signing request may include, for example: Country Name; State or Province Name; Locality Name; Organization Name; Organizational Unit Name; Common Name; and Email Address.

Accordingly, responsive to successful authentication (step 404) of a received certificate signing request, the certificate enrollment assistant 116 may review a certificate signing request to determine the extent to which the mobile communication device 100 has included attributes. Based on such determining, the certificate enrollment assistant 116 may then update (step 406) one or more of the attributes of the certificate signing request with user information, thereby producing an updated certificate signing request.

The certificate enrollment assistant 116 may then inject (step 408) the global challenge password into the updated certificate signing request, thereby producing a password-carrying certificate signing request. The challenge password is an optional attribute of a certificate signing request, as defined by the PKCS-10 standard.

The certificate enrollment assistant 116 may then determine a hash (step 410) of the password-carrying certificate signing request.

The certificate enrollment assistant 116 may then transmit (step 412) the hash to the mobile communication device 100. The certificate enrollment assistant 116 may also transmit the updated certificate signing request (i.e., not the password-carrying certificate signing request as the password is not to be exposed) to the mobile communication device 100.

The processor 228 of the mobile communication device 100 receives (step 308) the hash. Responsive to receiving (step 308) the hash, the processor 228 may sign (step 310) the hash to obtain a signature, where the signing uses the private key of the public-private key pair 124.

The processor 228 may then transmit (step 312) the certificate signing request, the signature and a Registration Authority (RA) certificate to the certificate enrollment assistant 116. Notably, the mobile communication device 100 may obtain the RA Certificate from the CA server using the address specified for the Certificate Authority Host in the CA Profile. In the absence of an RA, the processor 228 may transmit (step 312) the certificate signing request, the signature and a CA certificate to the certificate enrollment assistant 116. The certificate signing request transmitted in step 312 may be the original certificate signing request, transmitted in step 306, or may be the updated certificate signing request, received from the certificate enrollment assistant 116, along with the hash, in step 308. Conveniently, transmission of the certificate signing request in step 312 assists in avoiding, for some embodiments, the storing of state on the certificate enrollment assistant 116.

The certificate enrollment assistant 116 receives (step 414) the certificate signing request, the signature and the RA certificate.

The certificate enrollment assistant 116 may verify (step 416) the received RA certificate using configured thumbprints. It will be appreciated that a thumbprint of an RA certificate is a hash of the RA certificate. The certificate enrollment assistant 116 may have obtained the hash via a trusted channel between the certificate enrollment assistant 116 and the Registration Authority.

The certificate enrollment assistant 116 injects (step 418) the password into the certificate signing request. Notably, in some embodiments, the certificate enrollment assistant 116 does not maintain a copy of the password-carrying certificate signing request resulting from step 408. The certificate enrollment assistant 116 also adds the received signature to the certificate signing request, thereby producing a signed, password-carrying certificate signing request.

Typically, the RA receives and authenticates certificate signing requests and then passes the certificate signing requests to the CA, in which case the certificate enrollment assistant 116 encrypts (step 420) the signed, password-carrying certificate signing request using the RA public key to form an encrypted, signed, password-carrying certificate signing request. Sometimes, there is no RA and the certificate signing requests go directly to the CA, in which case the certificate enrollment assistant 116 encrypts (step 420) the signed, password-carrying certificate signing request using the CA public key to form an encrypted, signed, password-carrying certificate signing request.

The encrypted, signed, password-carrying certificate signing request may be enveloped using a data format defined by PKCS-7. PKCS-7, in particular, is a Cryptographic Message Syntax. The PKCS-7 standard is specified in Request For Comments (RFC) 2315 published by the IETF at www.ietf.org. The PKCS-7 standard can be used to digitally sign, digest, authenticate or encrypt any form of digital data and is often used for certificate dissemination.

The certificate enrollment assistant 116 transmits (step 422) the encrypted, signed, password-carrying certificate signing request to the mobile communication device 100.

The mobile communication device 100 receives (step 314) the encrypted, signed, password-carrying certificate signing request. The mobile communication device 100 may then sign (step 316) the encrypted, signed, password-carrying certificate signing request using PKCS-7 signed data format, thereby producing a properly formatted SCEP certificate signing request.

Such signing (step 316) of the encrypted, signed, password-carrying certificate signing request may involve generating a hash of the encrypted, signed, password-carrying certificate signing request and signing the hash, where the signing uses the private key of the key pair 124. The signed hash of the encrypted, signed, password-carrying certificate signing request may then be transmitted along with the encrypted, signed, password-carrying certificate signing request as a signature.

The mobile communication device 100 may then transmit (step 318) the SCEP certificate signing request, and the signature, to the CA 130 to enroll with the CA's SECP service. Notably, transmitting (step 318) the SCEP certificate signing request, and the signature, to the CA 130 need not be a direct transmission. Indeed, mobile communication device 100 may transmit (step 318) the SCEP certificate signing request, and the signature, to the CA 130 via other devices. Such other devices may include a messaging server or the registration authority.

Some duration of time later, the mobile communication device 100 may receive (step 320) a client certificate from the CA 130. Again, such receiving may be direct or accomplished via other devices. Such other devices may include a messaging server or the registration authority.

Conveniently, the final two steps, i.e., the transmission (step 318) of a certificate signing request to an SCEP service and reception (step 320) of a resulting certificate may be accomplished by the mobile communication device 100 without any enterprise server involvement and without revealing the global password to the mobile communication device 100.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of requesting a certificate, said method comprising:
   transmitting a certificate signing request to a certificate enrollment assistant module;
   receiving, from said certificate enrollment assistant module, a hash of an altered version of said certificate signing request, said altered version of said certificate signing request including a challenge password;
   signing said hash to produce a signature for said altered version of said certificate signing request;
   transmitting said signature for said altered version of said certificate signing request to said certificate enrollment assistant module;
   receiving an enveloped version of said altered version of said certificate signing request;
   determining a signature for said enveloped version of said altered version of said certificate signing request; and
   transmitting said enveloped version of said altered version of said certificate signing request and said signature for said enveloped version of said altered version of said certificate signing request to a certificate authority.

2. The method of claim 1 further comprising receiving, from said certificate authority, a certificate.

3. The method of claim 2 wherein said receiving said certificate comprises receiving said certificate via another device.

4. The method of claim 1 wherein said certificate signing request complies with Public Key Cryptography Standard 10.

5. The method of claim 1, further comprising, before said transmitting said certificate signing request to said certificate:
   generating a public key and a corresponding private key; and
   based on said public key, creating said certificate signing request.

6. The method of claim 5, wherein said signing said hash uses said private cryptographic key.

7. The method of claim 5, wherein said determining said signature further comprises:
   obtaining a hash of said enveloped version of said altered version of said certificate signing request; and
   signing, using said private key, said hash of said enveloped version of said altered version of said certificate signing request.

8. The method of claim 1 further comprising transmitting said certificate signing request to said certificate enrollment assistant module with said signature for said altered version of said certificate signing request.

9. The method of claim 1 further comprising transmitting a Registration Authority certificate to said certificate enrollment assistant module with said signature for said altered version of said certificate signing request.

10. The method of claim 1 wherein said enveloped version of said altered version of said certificate signing request comprises an encrypted version of said altered version of said certificate signing request.

11. The method of claim 10 wherein said enveloped version of said altered version of said certificate signing request complies with Public Key Cryptography Standard 7.

12. The method of claim 1 wherein said transmitting said enveloped version of said altered version of said certificate signing request and said signature for said enveloped version of said altered version of said certificate signing request to a certificate authority comprises transmitting said enveloped version via another device.

13. A computing device comprising:
a communication subsystem operated to:
transmit a certificate signing request to a certificate enrolment assistant module;
receive, from said certificate enrolment assistant module, a hash of an altered version of said certificate signing request, said altered version of said certificate signing request including a challenge password;
transmit a signature for said altered version of said certificate signing request to said certificate enrolment assistant module;
receive an enveloped version of said altered version of said certificate signing request;
transmit said enveloped version of said altered version of said certificate signing request and a signature for said enveloped version of said altered version of said certificate signing request to a certificate authority; and
a processor operated to:
sign said hash to produce said signature; and
determine said signature for said enveloped version of said altered version of said certificate signing request.

14. A non-transitory computer-readable medium containing computer-executable instructions that, when performed by a processor in a computing device, cause said processor to:
transmit a certificate signing request to a certificate enrolment assistant module;
receive, from said certificate enrolment assistant module, a hash of an altered version of said certificate signing request, said altered version of said certificate signing request including a challenge password;
sign said hash to produce a signature for said altered version of said certificate signing request;
transmit said signature to said certificate enrolment assistant module;
receive an enveloped version of said altered version of said certificate signing request;
determine a signature for said enveloped version of said altered version of said certificate signing request; and
transmit said enveloped version of said altered version of said certificate signing request and said signature for said enveloped version of said altered version of said certificate signing request to a certificate authority.

* * * * *